United States Patent
Kopeschka et al.

(10) Patent No.: US 11,143,113 B2
(45) Date of Patent: Oct. 12, 2021

(54) HYBRID GAS TURBINE ENGINE CONTROL SYSTEM

(71) Applicant: Rolls-Royce Corporation, Indianapolis, IN (US)

(72) Inventors: David Kopeschka, Brownsburg, IN (US); Peter Michael Schenk, Greenwood, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 232 days.

(21) Appl. No.: 16/287,641

(22) Filed: Feb. 27, 2019

(65) Prior Publication Data

US 2020/0271061 A1  Aug. 27, 2020

(51) Int. Cl.
*F02C 9/48* (2006.01)
*F02C 9/28* (2006.01)
*F02D 45/00* (2006.01)

(52) U.S. Cl.
CPC .......... *F02C 9/48* (2013.01); *F02C 9/28* (2013.01); *F02D 45/00* (2013.01); *F05D 2220/321* (2013.01); *F05D 2220/76* (2013.01); *F05D 2270/02* (2013.01); *F05D 2270/304* (2013.01)

(58) Field of Classification Search
CPC ........ F02C 9/48; F02C 9/28; F05D 2220/321; F05D 2220/76; F05D 2270/02; F05D 2270/304; F02D 45/00
See application file for complete search history.

(56) References Cited

U.S. PATENT DOCUMENTS

| | | | |
|---|---|---|---|
| 5,282,719 A | 2/1994 | McCarty et al. | |
| 7,245,040 B2 | 7/2007 | Mukavetz et al. | |
| 8,850,790 B2 | 10/2014 | McLeister et al. | |
| 9,586,690 B2 | 3/2017 | Rajashekara et al. | |
| 10,476,417 B2 * | 11/2019 | Noderer | H02P 9/04 |
| 2009/0145998 A1 | 6/2009 | Salyer | |
| 2015/0151844 A1 | 6/2015 | Anton et al. | |
| 2015/0367950 A1 * | 12/2015 | Rajashekara | B64C 11/305 |
| | | | 701/3 |
| 2017/0275009 A1 | 8/2017 | Huang | |
| 2017/0291712 A1 * | 10/2017 | Himmelmann | B64D 27/10 |

(Continued)

FOREIGN PATENT DOCUMENTS

GB  2459777 A  * 11/2009  ............ F02C 9/263

*Primary Examiner* — Geepy Pe
*Assistant Examiner* — Kyle J Kingsland
(74) *Attorney, Agent, or Firm* — Crowell & Moring LLP

(57) ABSTRACT

A system includes a controller configured to monitor a fuel system supplying fuel to a gas turbine engine. The system also includes an electric propulsion system controlled by the controller. The electric propulsion system is configured as a variable load, which is supplied rotational energy by the engine. The controller is configured to dynamically control a magnitude of the variable load to adjust rotational speed of the gas turbine engine during a fixed level of fuel supply to the gas turbine engine. The electric propulsion system may include an electric generator and a plurality of propulsor motor(s) rotating a propulsor to provide thrust and/or lift to a vehicle such as an aircraft. The electric generator may be rotationally driven with the gas turbine engine to output electric power. The electric power is supplied to the propulsor motor(s) to rotate the propulsor to provide thrust and/or lift of the vehicle.

20 Claims, 5 Drawing Sheets

(56) References Cited

U.S. PATENT DOCUMENTS

| | | | | |
|---|---|---|---|---|
| 2017/0342908 A1* | 11/2017 | Hon | .......................... | F02C 9/22 |
| 2018/0043896 A1* | 2/2018 | Lee | ....................... | B60W 10/06 |
| 2018/0346132 A1* | 12/2018 | Casado-Montero | ... | B64D 13/06 |
| 2020/0131995 A1* | 4/2020 | Trawick | ................ | G01M 15/14 |

* cited by examiner

US 11,143,113 B2

HYBRID GAS TURBINE ENGINE CONTROL SYSTEM

TECHNICAL FIELD

This disclosure relates to gas turbine engines and, in particular, to hybrid gas turbine engine control systems.

BACKGROUND

Gas turbine engines may include a compressor, a combustor and a turbine. Typically, the compressor is an air compressor rotating on a shaft of the engine to provide air for the combustion cycle. The air is provided to the combustor along with fuel where combustion occurs to create a high pressure, high temperature flow, which is provided to the turbine. The turbine may provide mechanical torque to the shaft and may provide exhaust gas that creates thrust.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A hybrid gas turbine engine control system or system may include a controller configured to monitor a status of a fuel system supplying fuel to a gas turbine engine. The system may also include an electric generator rotationally driven with the gas turbine engine to output electric power. The electric power output by the generator may be supplied to a propulsor motor of an aircraft or vehicle. The system may also include an energy sink controlled by the controller to selectively consume electric power output by the electric generator. The energy sink may be configured by the controller to selectively consume electric power in response to an absence of modulation in fuel supplied by the fuel control system to the gas turbine engine, such as when the fuel supplied to the gas turbine engine is in a Fail Fixed mode resulting in a non-varying output horsepower of the gas turbine engine.

One interesting feature of the systems and methods described may be that the energy sink includes different components of the system that the controller may selective control to adjust a level of efficiency of operation of the different components such the individual components consume more or less energy. Accordingly, at least a portion of the energy sink may be represented by inefficiencies deliberately and independently implemented by the controller to be part of the load. The energy sink may be selectively varied by the controller in order to maintain the rotational speed of the gas turbine engine in a predetermined speed range.

Another interesting feature of the systems and methods described may be that the system may include an electric generator and electric energy adapters, at least some of which receive electric power output from the electric generator. The energy adapters may adjust a voltage level and/or provide conversion of electric power between alternating current (AC) and direct current (DC) using high speed switching. The controller may adjust the high speed switching of the energy adapters to introduce load into the system.

Figure 1:
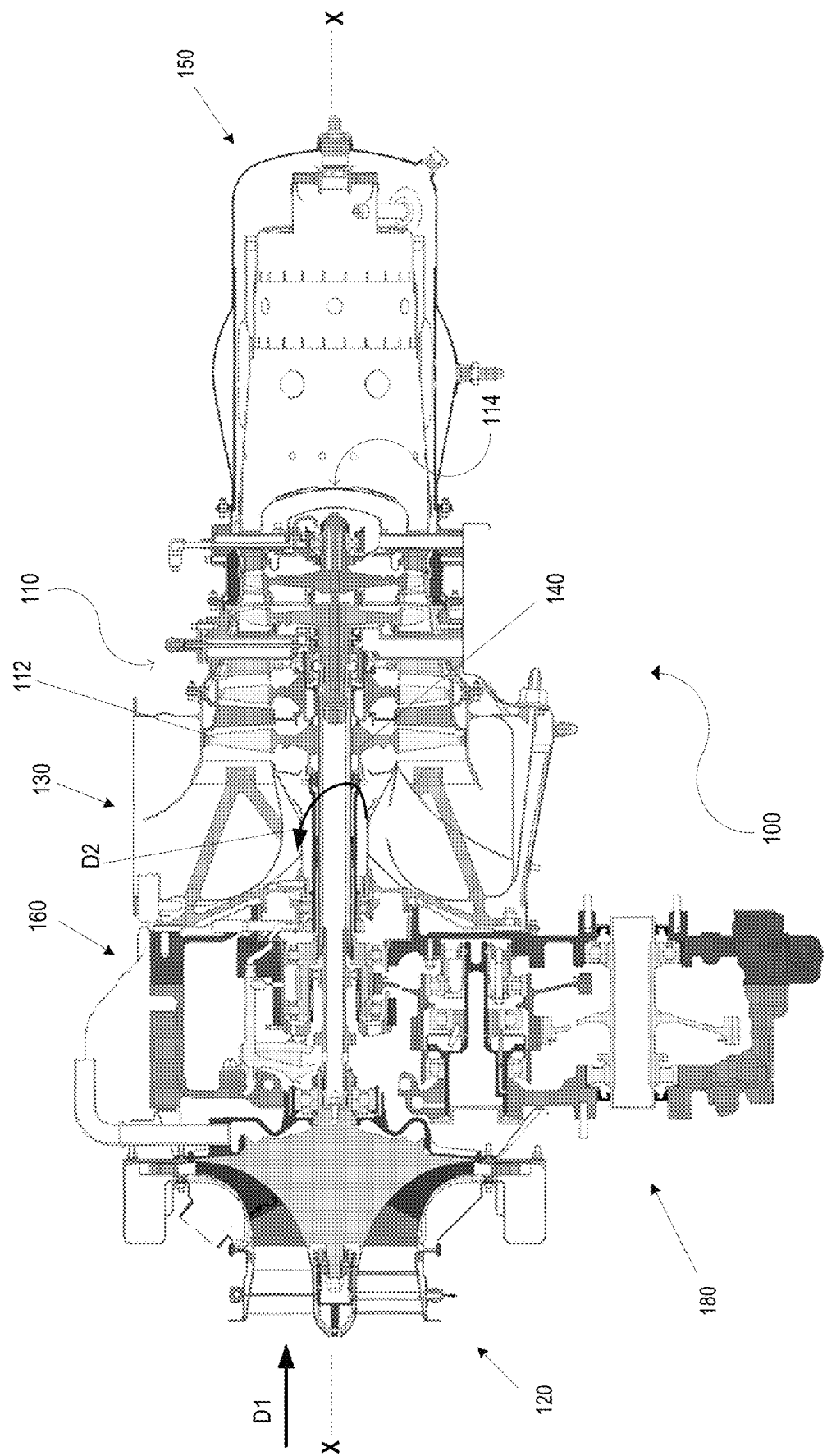
FIG. 1 illustrates a cross-sectional view of an example of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, and any other airborne vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as a two-spool engine having a centrifugal compressor and axial flow gas generator and power turbine stages, in some forms the gas turbine engine 100 may have one or multiple spools and/or may be any form of axial flow engine or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples. In some examples, the gas turbine engine 100 may include a power transfer 180 in the form of a transmission or gearbox. The power transfer 180 may extract energy from the engine output in the form or torque at an angular velocity, and transfer such energy to other components within an aircraft. In an example of a helicopter or airplane, the power transfer 180 may transfer energy extracted from the engine to one or more propulsors. As used herein, the term "propulsor" or "propulsors" is defined as a helicopter rotor, an airplane propeller, a ducted fan, or other mechanical device that is rotational driven by a motor to provide propulsion.

Figure 2:
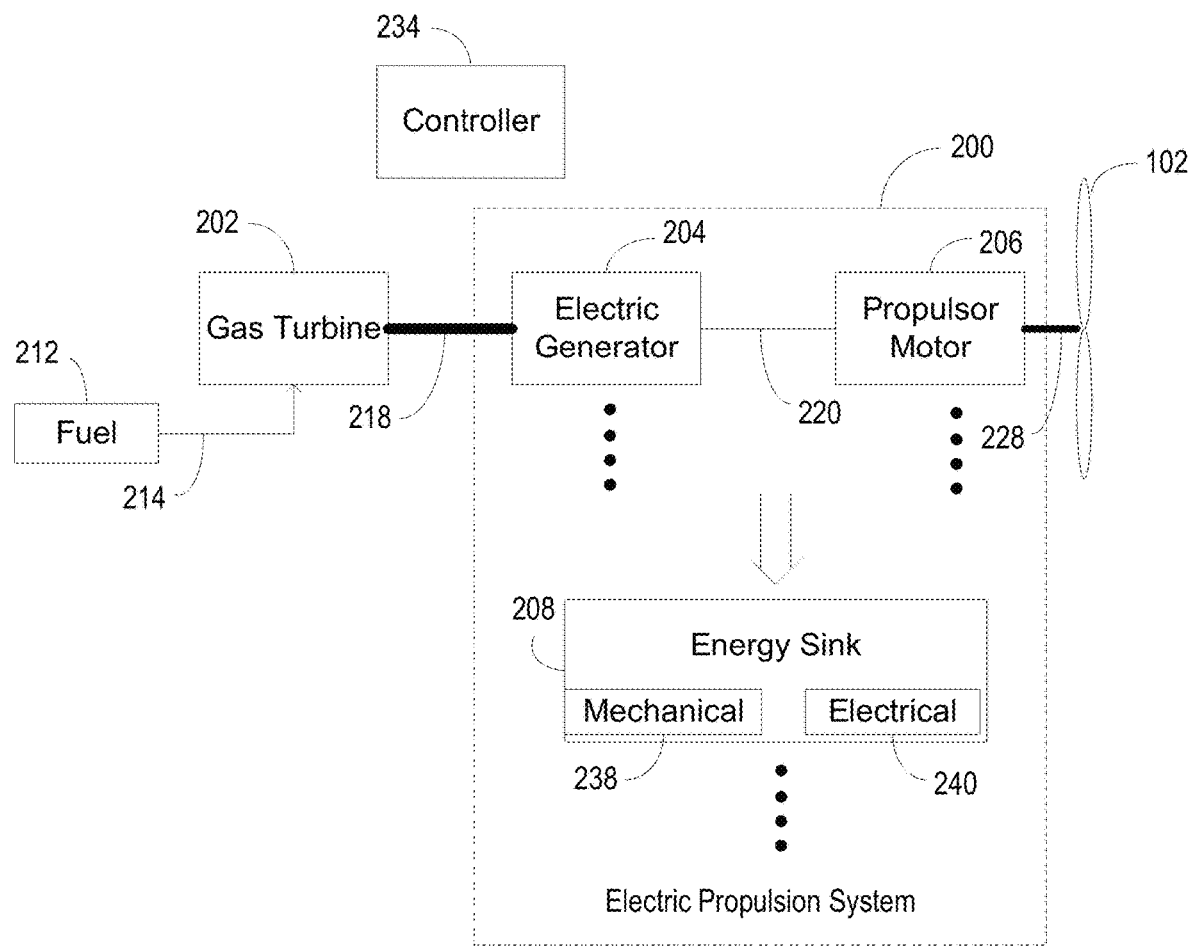
FIG. 2 is a block diagram example of an electric propulsion system operable with a gas turbine engine as a hybrid propulsive system.

FIG. 2 is a block diagram example of an electric propulsion system 200 operable with a gas turbine engine 202 as a hybrid propulsive system for an aircraft or other vehicle. The electric propulsion system 200 includes at least one electric generator 204, at least one propulsor motor 206, and at least one energy sink 208. The electric propulsion system 200 may be configured as a variable load supplied rotational energy by the gas turbine engine 202. The gas turbine engine 202 may be supplied fuel by a fuel system 212 at a variable flow rate to vary the rotational torque output of the gas turbine engine 202. A fuel flow rate through a fuel line 214 to the gas turbine engine 202 may be variably controlled by the fuel system 212 based at least in part on a demand signal requesting a magnitude of rotational torque output from the gas turbine engine 202. The gas turbine engine 202 may include a power takeoff that spins a rotational shaft 218 mechanically coupled to the electric generator 204.

The generator 204 may be an asynchronous or synchronous machine capable of outputting electric power when rotated by the shaft 218. The electric power may be output as alternating current (AC) or direct current (DC) power. The electric power output from the generator 204 may be output to one or more electric power supply busses 220. Loads may be electrically coupled with the power supply bus 220 and supplied the electric power output from the generator 204. A voltage of the electric power on the power supply bus 220 may be stepped up, stepped down, or converted, such as from AC to DC prior to being supplied to the loads. One of these loads may be the propulsor motor load 206.

The propulsor motor load 206 may be energized by the voltage present on the power supply bus 220 to rotate a propulsor 102, such as an airplane propeller or a helicopter rotor, which can provide lift and/or thrust to the aircraft or other vehicle. The propulsor motor load 206 may include one or more induction or synchronous motors operable to rotate an output shaft 228 when energized with a variable rotational torque. The output shaft 228 may be mechanically coupled with the propulsor 102.

The system for the aircraft or other vehicle may also include a controller 234. The controller 234 may include circuitry configured to perform the functions described herein. The controller 234 may, for example, include a non-transitory memory with instructions stored therein that are executable by the controller 234. The controller 234 may include one or more processors executing logic based on the stored instructions.

During operation, the controller 234 may be configured to monitor the status of the fuel system 212 supplying fuel to the gas turbine engine 202. In addition, the controller 234 may control the electric propulsion system 200 of the aircraft. Control of the electric propulsion system 200 may include the controller 234 dynamically controlling a magnitude of the variable load to adjust a rotational speed of the gas turbine engine 202 during a fixed level of fuel supply to the gas turbine engine.

An example gas turbine engine 202 used in an aircraft, such as a Rolls Royce M250 engine, may include an engine controller, such as a full authority digital control system (FADEC). The fuel system 212 may include a motor controlled fuel valve, such as a stepper motor driven fuel metering valve to regulate and control the flow of fuel to the gas turbine engine 202 in accordance with control signals received from the FADEC. In the situation of a total loss of fuel control modulation, the fuel system 212, such as a small gas turbine full authority digital engine control (FADEC) (SGTF) Dual Channel system, may be designed to Fail-Fixed fuel flow so that the flow of fuel through the fuel line 214 to the gas turbine engine 202 at the time failure occurs remains substantially unchanged. This provides the pilot an opportunity to safely land the aircraft while the gas turbine engine is still providing rotational torque.

During such a Fail-Fixed event, whatever power setting the gas turbine engine 202 is at, such as 300 horsepower (hp) for example, will be locked at that power setting, until fuel is disconnected from the gas turbine engine 202. Disconnection of fuel from the gas turbine engine 202 may occur, for example, when a pilot of the aircraft manually operates a mechanical fuel shutoff valve. During this situation, any change to the load, such as load within the electric propulsion system 200, of the gas turbine engine 202, either increasing or decreasing, results in a change to the power turbine rotational speed or angular velocity. If the Fail-Fixed event occurs at a high power setting, such as during aircraft takeoff, or at mid-power setting, such as during aircraft cruise, when it comes time to descend and land the aircraft, the reduction in load on the gas turbine engine 202 may result in a power turbine speed increase, possibly into an overspeed condition.

In examples, the FADEC may include an overspeed protection system, which remains active during the Fail-Fixed event. The overspeed protection system may operate to catch or otherwise prevent the gas turbine engine 202 exceeding either an overspeed condition or an underspeed condition, by providing limit based fuel control, such as "rudimentary bang-bang" fuel control, to maintain the rotational speed of the gas turbine engine 202 between predetermined percentages of rated rotational speed, such as between about 112% and 120% of rated speed. In some situations, such limit based fuel control may detrimentally affect operation of the gas turbine engine or the aircraft.

To avoid the overspeed protection system providing such fuel control during the Fail-Fixed event, or in examples where the overspeed protection fails or does not exist, the fixed level of fuel supplied during the Fail-Fixed event may represent a fixed power output setting of the gas turbine engine 202, and the rotational speed of the gas turbine engine 202 may be adjusted by the controller 234 by increasing or decreasing the variable load to slow or speed up the rotational speed of the gas turbine 202. The variable load may be adjusted using the variable energy sink 208, which is included as part of the variable load. The energy sink 208 may be controlled by the controller 234 to increase or decrease the rotational speed of the gas turbine engine 202 by controlling variation of the variable load supplied by rotational energy of the gas turbine engine 202. The energy sink 208 may be dynamically controlled to adjust the variable load in order to increase a magnitude of the rotational energy of the gas turbine engine 202 absorbed by the energy sink 208 in response to receipt, by the controller 234, of a propulsion signal indicative of a lower demand for rotational energy of the gas turbine engine 202, while the status of fuel supply is Fail-Fixed condition or mode.

The variable energy sink 208 may include a variable mechanical energy sink 238 and a variable electrical energy sink 240. Components within each of the variable mechanical energy sink 238 and the variable electrical energy sink 240 may be independently controllable by the controller 234 as part of the variable load. For example, the variable energy sink 208 may include at least two of an electric converter, an electric energy storage device, a motor thrust control, or a resistive load.

The variable mechanical energy sink 238 may include, for example, a blade pitch control of the propulsor 102 of the aircraft. The blade pitch control may vary the pitch or angle of attack of the propulsor 102 to increase or decrease the thrust efficiency and corresponding load on the propulsor motor 206. In another example, a motor thrust control may control some of the propulsor motors 206 providing propulsion for the aircraft via the controller 234 to selectively operate in reverse to contribute to the variable mechanical energy sink 238.

The variable electrical energy sink 240 includes electrical devices in the electric propulsion system 200 that may be controlled to increase or reduce power consumption. In some examples, power consumption may be increased or decreased by respective, energization or de-energization of electrical devices. In other cases, power consumption may be increased or decreased by controlling electrical efficiency of operation of energized electric devices. For example, the electrical efficiency of the electric generator, the propulsor motors 206 or other devices, such as energy storage devices or electric energy adapters may be adjusted by the controller 234. In addition, in aircraft or other vehicles, unused or non-essential electrical devices and systems, such as de-icing systems, environmental systems (e.g. heating and cooling systems), lighting systems and other electrical loads may be selectively energized and deenergized by the controller 234 to respective increase or decrease the electrical load.

Figure 3:
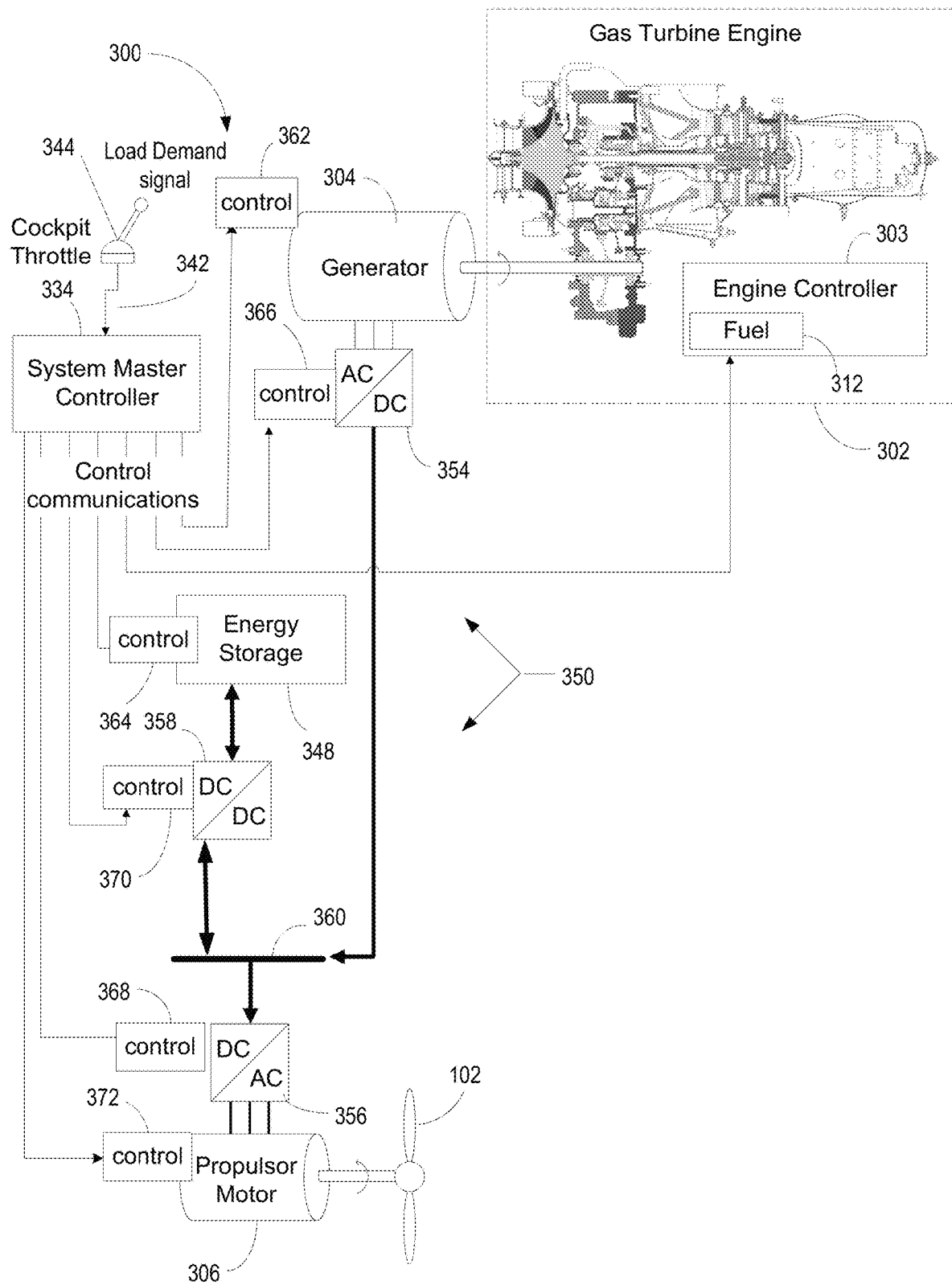
FIG. 3 is a block diagram of an example of an electric propulsion system and a gas turbine engine operable as a hybrid propulsive system.

FIG. 3 is a block diagram of an example of an electric propulsion system 300 and a gas turbine engine 302 operable as a hybrid propulsive system in an aircraft or other vehicle. The gas turbine engine 302 may be controlled by an engine controller 303, such as a full authority digital engine control (FADEC) system. The engine controller 303 may include, or be in communication with, for example, a fuel system 312 and/or any other systems or devices used to operate the gas turbine engine 302. Unless otherwise indicated, the features and functionality of the electric propulsion system 200 and the gas turbine engine 202 (FIG. 2) are similar. Accordingly, for purposes of brevity the details of these features and functionality will not be repeated, and it should be understood that features and functionality are fully interchangeable, combinable, and/or useable in the example systems described herein.

The electric propulsion system 300 includes a controller 334, such as a system master controller, which may receive a load demand signal over a load demand signal line 342. The load demand signal may be provided from, for example, a cockpit throttle 344 for an aircraft or other vehicle to be indicative of a request for more or less lift and/or thrust (output power) from one or more propulsor motors 306 and respective propulsors 102. In other examples, the load demand signal may be provided from other sources, such as another controller. In response to changes in the load demand signal, the controller 334 may provide control communications to various components of the electric propulsion system 300 and the engine controller 303 of the gas turbine engine 302. The engine controller 303 may correspondingly control the fuel system to modulate fuel flow to the gas turbine engine 302 in accordance with the load demand signal.

In the example of FIG. 3, the components in the electric propulsion system 300 include a generator 304, the propulsor motors 306, a propulsor 102, one or more energy storage devices 348 and one or more electric energy adapters 350. The electric generator 304 may be rotational driven with the gas turbine engine 302 to output electric power, which is supplied to the propulsor motor 306. The energy storage device 348 may be a battery, a capacitor, or any other device or system capable of storing electrical energy. The electric energy adapters 350 may adjust a voltage level and/or provide conversion of electric power between alternating current (AC) and direct current (DC). In the example of FIG. 3, the electric energy adapters 350 include a rectifier 354, an inverter 356 and a converter 358. The rectifier 354 may rectify AC power received from the electric generator 304 to provide DC power to a power supply bus 360. The inverter 356 may invert DC power received from the power supply bus 360 to provide AC power to the propulsor motors 306. The converter 358 may convert a voltage level of DC power received to a different voltage level of DC power. The generator 304, the energy storage devices 348 and/or electric energy adapters 350 may receive control communications directly from the controller 334.

Alternatively, the controller 334 may indirectly control the generator 304, the energy storage devices 348 and electric energy adapters 350 via local control in communication with the controller 334. The generator 304, the energy storage devices 348 and electric energy adapters 350 may include, or be in communication with, a respective local control that provides the operational functionality of the respective system or device. For example, the generator 304 may include a local generator control 362 configured to control the electrical characteristics and operation of the generator 304, such as the power factor angle, excitation voltage, and/or watts produced. In another example, where the energy storage device 348 is a battery, a local electric storage control 364 associated with the energy storage device 348 may include the functionality to enable selective charge and discharge of the battery in accordance with predetermined operational parameters, such as charge and discharge limits. In another example, the rectifier 354 may include a local rectifier control 366 configured to control active rectification switching of the rectifier 354 from AC to DC power. In still another example, the inverter 356 may include a local inverter control 368, configured to control active conversion switching of DC power from the power supply bus 360 to AC power to drive the propulsor motors 306. In yet another example, the converter 358 may include a local converter control 370, configured to regulate the DC voltage and current output to the power supply bus 360. In still another example, the propulsor motor 206 may include a local motor control 372 configured to control the efficiency of the propulsor motors 306, the motor thrust and/or propulsor blade pitch control.

During a Fail-Fixed event, when the gas turbine engine 302 is producing a fixed amount of horsepower due to the fixed fuel flow, and a reduction in the load demand signal is received by the controller 334, such as during an aircraft descent or landing phase, the controller 334 may determine and identify (e.g. find) other places to "dump" or "sink" the unwanted horsepower that the Fail-Fixed gas turbine engine 302 is producing. In this way, the rotational torque produced by gas turbine engine 302 operating at a fixed output may remain aligned with the load, thereby preventing an overspeed or underspeed condition of the gas turbine engine 302. In other words, the counter torque on the shaft of the electric generator 304 (due to the load being supplied) may be controlled by the controller 334 within a range to avoid over speed or under speed of the gas turbine engine 302 by the controller 334 selectively adding or removing load as demand to the propulsor motors 306 is varied via the load demand signal.

For example, one or more of the components may be operated by the controller 334 as an energy sink to selectively consume electric power output by the electric generator 304. As previously discussed, a Fail-Fixed event involves an absence of modulation in fuel supplied by the fuel control system 312 to the gas turbine engine 302. Modulation of the fuel may be expected, for example in response to changes in the load demand signal. When the expected modulation does not occur in response changes in the load demand signal, the controller 334 may determine or be provided a status signal indicating that a Fail-Fixed event is occurring and one or more of the components may be operated by the controller 334 as an energy sink. The energy sink is controllable by the controller 334 and may include, for example, the generator 304, the energy storage device 348, and the electric energy adapters 350. In addition, the energy sink may include any other energy consuming device or system, such as environmental control systems, deicing systems, motor thrust control, motor pitch control or a resistive load.

Examples of energy sinks controlled by the controller 334 to receive unwanted power include charging batteries included in the energy storage device 348. In some examples, this may be a first choice of the controller 334 for an energy sink. Nevertheless, constraints such as rate of charge limitations of the battery may limit usefulness of the batteries as an energy sink. In addition, there may be added complications regarding monitoring the state-of-charge of the battery. Moreover, if the battery is fully charged, then no additional charging may be warranted.

Another example of energy sinks controlled by the controller 334 to receive unwanted power involve increasing power consumption by loads such as hotel loads present in the aircraft or vehicle. For example, in an aircraft an anti-icing system may be energized regardless of environmental conditions, or environmental conditioning systems/ air-conditioning systems, and the like that are present in the aircraft or vehicle may be controlled to consume maximum energy regardless of the environmental conditions. Each of the hotel loads, or parasitic loads, by themselves may not represent significant energy consumption, however, the combination by the controller 334 of a number of different hotel loads may be enough in some situations to reduce the amount of energy needed to be dissipated such that the combination of the load demand signal and the energy sink may be aligned with the fixed output horsepower of the gas turbine engine 302.

Yet another example of energy sinks controlled by the controller 334 to consume unwanted power may involve the controller 334 controlling inefficiency in the electric propulsion system 300. For example, the controller 334 may be configured to put the electric generator 304, the electric energy adapters 350, or the propulsor motor 306 into less efficient modes of energy conversion. For example, switching off or tapering off active rectification of the generator 304 output power may reduce the efficiency of the AC-to-DC rectification by up to 50% or more. In another example, varying the coils' energization timing of the propulsor motors 306 may reduce the efficiency of the DC-to-AC conversion, resulting in wasteful-heating of the motor windings of the propulsor motors 306. In some examples, the components of the electric propulsion system 300 may be designed/sized properly to operate as energy sinks, or the level of energy absorption provided through inefficient operation may be maintained below predetermined thresholds. For example, an oil cooling system for the propulsor motors 306 may be sized appropriately to reject heat due to being operated inefficiently, or inefficient operation may be maintained below a threshold equivalent to a maximum horsepower operating condition.

Still another example, of energy sinks controlled by the controller 334 to consume unwanted power may involve the controller 334 controlling motor thrust reversal. In the case of fixed-pitch multi-propulsor/propeller aircraft, some of the propulsor motors 306 may be directionally reversed, thus generating reverse thrust, while the remaining propulsor motors 306 may be producing positive thrust. The controller 334 may include Fail-Fixed control algorithms designed to satisfy both the needs of maintaining the rotational speed of the gas turbine engine 302 (Np speed) by maintaining the load substantially constant, while also controlling the vehicle's net forward thrust needed to descend and land according to the load demand signal.

Still another example, of energy sinks controlled by the controller 334 to consume unwanted power may involve the controller 334 controlling propeller/fan pitch. In the case of a multi-propulsor constant speed propeller/fan aircraft, a predetermined number, such as half of the propulsors may be controlled by the controller 334 to reduce torque (and therefore beta (blade pitch) and forward thrust), while the another portion, such as the other half, of the propulsors may be controlled by the controller 334 to increase beta by operating the propulsors to provide relatively low forward thrust at relatively high horsepower, such as in a propulsor operating region just prior to Feather. Such a low forward thrust operating region is generally not used for propeller control, as it is an inefficient region of the prop operating envelope, consisting of high engine load and low forward thrust. The controller 334 may include Fail-Fixed control algorithms designed to satisfy both the needs of maintaining the rotational speed of the gas turbine engine 302 (Np speed) by maintaining the load substantially constant, while also controlling the vehicle's net forward thrust needed to descend and land according to the load demand signal.

Still another example, of energy sinks controlled by the controller 334 to consume unwanted power may involve one or more resistive loads, such as a dump resistor, controlled by the controller 334. The resistive load may be any form of load capable of converting electric power to heat. For example, the resistive load may be carbon, metal or metal oxide film. Operation of the resistive load may be repeatable, or may be a onetime use resulting in a controlled catastrophic failure of the resistive load. For example, the resistive load may include wires or cables designed to heat rapidly when electric power is applied and melt or otherwise continue to provide a resistive load as the temperature continues to increase. In another example, portions of the vehicle may be designed as a resistive load to receive and dissipate electric power as heat. For example, a portion of the frame of an aircraft or vehicle may be designed to have resistive properties and be electrically isolated from the remaining vehicle frame so that electric power applied is dissipated as heat. In another example, a bleed-down resistor included in a bleed-down system, which de-energizes the power bus of an aircraft after landing, may also be used as a resistive load. For example, the bleed-down resistor could be sized much larger than a normal bleed-down resistor, and have a variable current controller to modulate the load.

In other examples, other forms of energy sinks could be controlled by the controller 334 to selectively vary the load during a Fail-Fixed event to manage the rotational speed (Np) of the gas turbine engine 302 during a reduction (or increase) in the electric power supplied to the propulsor motors 306. The rotational speed of the gas turbine engine 302 may be maintained in a predetermined range by the controller 334 diverting at least some of the electric power output by the electric generator 304 from the propulsor motors 306 to the energy sink. Upon the controller 334 receiving a reduction in the load demand signal indicative of a reduction in load of the propulsor motors 306, the controller 334 may determine that a corresponding modulation in fuel supplied to the gas turbine engine 302 is absent, and divert a magnitude of the electric power output by the electric generator 304 to the energy sink. The controller 334 may determine and select portions of the energy sink to use based on the magnitude of the electric power that needs to be diverted.

Accordingly, the magnitude of power being diverted may be equivalent to the reduction in load demand signal to the propulsor motors 306. Thus, the controller 334 is configured to control the energy sink to effectively increase or decrease counter-torque on the gas turbine engine 302 to manage the rotational speed of the gas turbine engine 302 by increasing an energy demand from, for example, the electric generator 304. Using the energy sink, the controller 334 may decrease efficiency of operation of the electric generator 304 or loads such as an electric energy adapter 350 in order to contribute to the variable electrical energy sink. Thus, the controller 334 may control efficiency of the electric energy adapter 350 to increase a magnitude of rotational energy of the gas turbine engine 302 absorbed by the energy sink.

Figure 4:
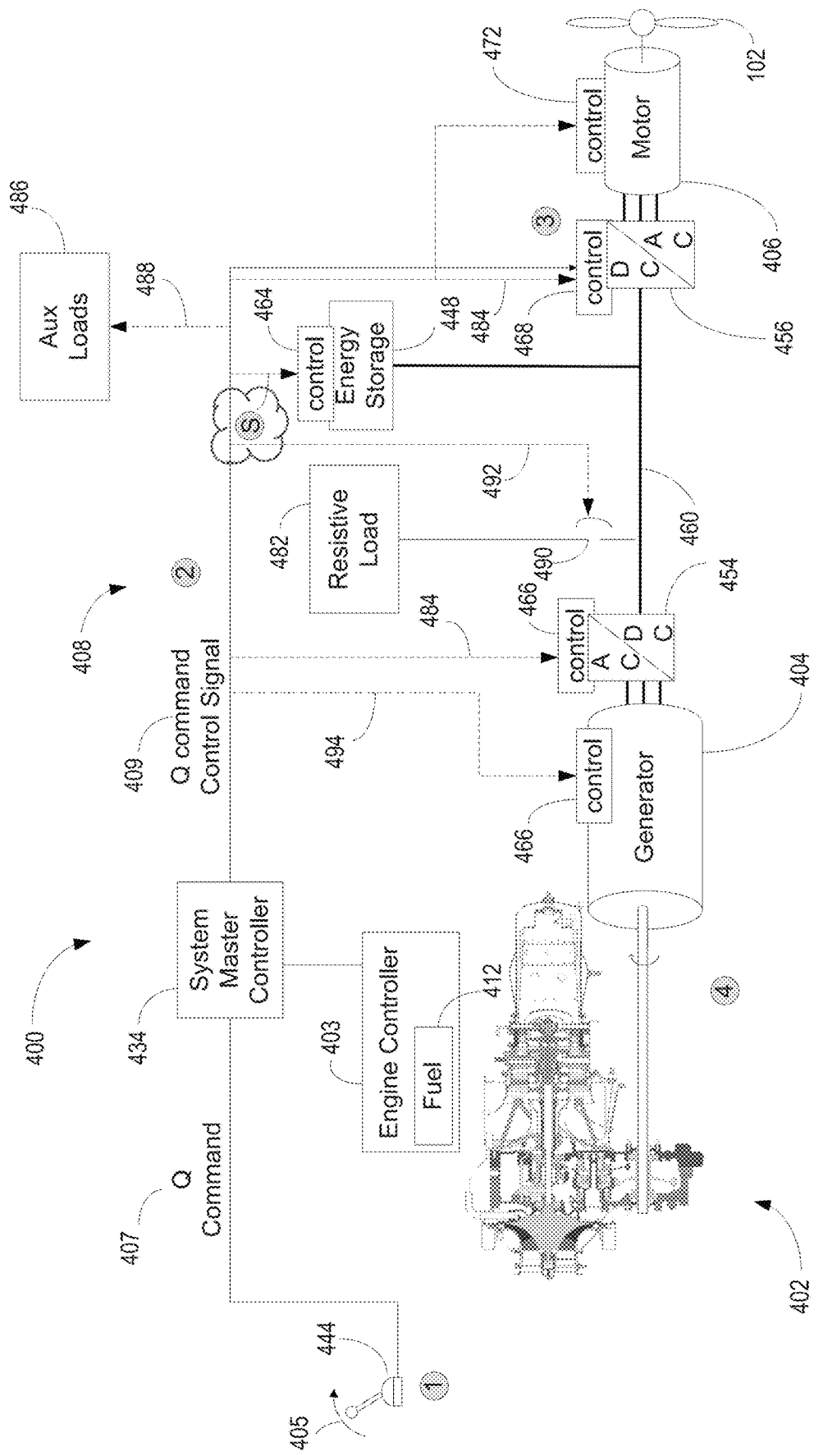
FIG. 4 is a block diagram of an example of an electric propulsion system and a gas turbine engine operable as a hybrid propulsive system.

FIG. 4 is a block diagram of an example of an electric propulsion system 400 and a gas turbine engine 402 operable as a hybrid propulsive system in an aircraft or other vehicle. Unless otherwise indicated, the features and functionality of the electric propulsion system 200 and the gas turbine engine 202 (FIG. 2) and the electric propulsion system 300 and the gas turbine engine 302 (FIG. 3) are similar. Accordingly, for purposes of brevity the details of these features and functionality will not be repeated, and it should be understood that features and functionality are fully interchangeable, combinable, and/or useable in the example systems described herein.

In the example of FIG. 4, operation of a controller 434, or system master controller, of the electric propulsion system 400 is illustrated during a load demand signal (Q command 407) in the form of a command of XX torque received from, for example, a cockpit throttle 444 for an aircraft or other vehicle, as illustrated by circled number "1" in FIG. 4. The Q command 407 may be a request for more lift and/or thrust (output power) from one or more propulsor motors 406 and respective propulsors 102 as illustrated by arrow 405. In response, the controller 434 may output a Q command control signal 409 to the local inverter control 468 of one or more inverters 456 to increase the current and/or voltage supplied to one or more respective propulsor motors 406 as illustrated by circled number "2" in FIG. 4. In response, the inverter 456 and propulsor motor 406 begin to deliver xx torque (Q) to the propulsor 102 and the lift and/or thrust of the vehicle increases as illustrated by circled number "3" in FIG. 4.

Due to the increased xx torque (Q) being supplied to the propulsor motors 406, the magnitude of voltage on the power supply bus 460 may be reduced and/or the current flow out of the power supply bus 460 may increase. The local control 466 of the rectifier 454 may operate to maintain a predetermined voltage on the power supply bus 460, and the local control 466 of the generator 404 may adjust the electric generator 404 accordingly to maintain the voltage on the power supply bus 460. In addition, the energy storage 448 may contribute power to the power supply bus 460. Note that in the example of FIG. 4, energy storage 448 is not supplied through a DC/DC converter as in the examples of FIG. 3.

During operation outside Fail-Fixed mode, due to the increase in load of the electric generator 404, the fuel supplied to the gas turbine engine 402 may be increased by the engine controller 403 using the fuel system 412 such that the gas turbine engine produces xx torque (Q) to maintain the current demands on the power supply bus 460 as illustrated by the circled number "4" in FIG. 4. Alternatively, or in addition, some amount of power may be supplied by the energy storage system 448.

After the electric propulsion system 400 increases or decreases xx torque (Q) delivered by the inverter 456 and propulsor motor 406, and the voltage on the power supply bus 460 increases or decreases the controller 434 may determine or be signaled a status, such as by the engine controller 403, that the gas turbine engine 402 is in a mode of a fixed level of fuel supply (Fail-Fixed mode) due to absence of modulation in fuel supplied to the gas turbine engine 402.

Figure 5:
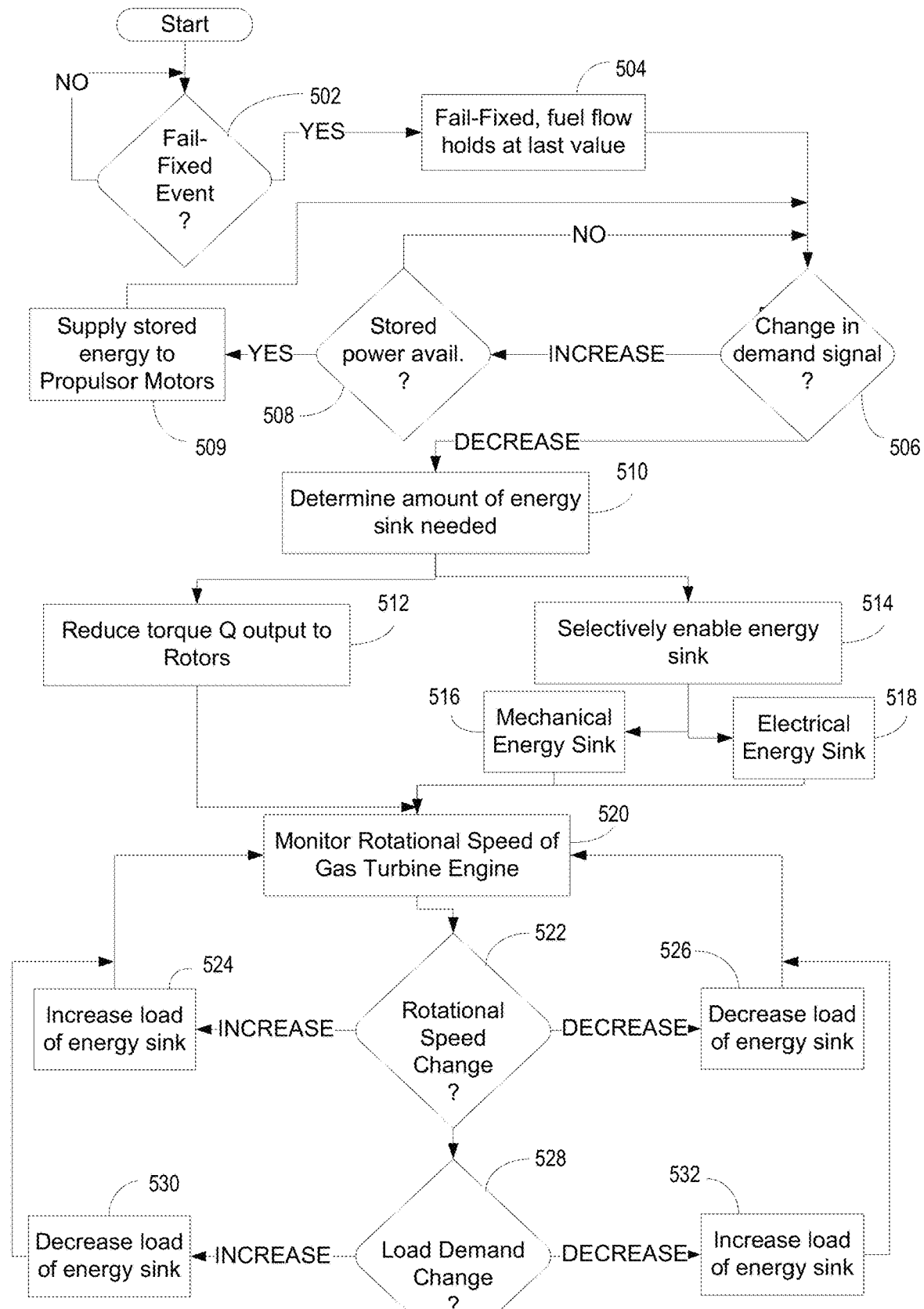
FIG. 5 is a flow diagram illustrating an example of operation of a hybrid propulsive system.

FIG. 5 is a flow diagram illustrating an example of operation of a hybrid propulsive system. The example operation will be described with reference to FIG. 4. During operation while the generator 404 is driven by the gas turbine engine 402 to generate power for the propulsor motors 406, the controller 434 may monitor for a Fail-Fixed event, such as by monitoring the fuel system 412 supplying fuel to the gas turbine engine 402. (502) When a Q command 407 load demand signal to reduce the current horsepower output demand of the propulsor motors 406 is received, the controller 434 may confirm/determine the Fail-Fixed event by confirming there is no modulation of fuel flow to the gas turbine engine 402 via, for example, a status signal or via the fuel system 412. If there is no Fail-Fixed event mode indicated or determined by the controller 434, the controller 434 may continue monitoring. If there is a Fail-Fixed event indicated or determined, the fuel flow holds, or is fixed, at the last flow rate value occurring at the time the Fail-Fixed mode was indicated or determined. (504) The controller 434 may establish the current horsepower output of the gas turbine engine 402 as a new 100% or maximum output torque based on fuel, due to the held or fixed fuel flow rate.

The controller 434 may monitor for changes in the demand signal (506) If a load demand signal is received by the controller 434 as a Q command 407 to increase torque output of the propulsor motor 406 to the respective propulsor 102, the controller 434 may determine if any stored power, such as battery power, is available. (508) If no stored power is available, no action is taken, and the controller 434 monitors for further changes in the demand signal. If, however, stored energy is available, the controller 434 may allocated stored energy to selectively increase the horsepower output of the propulsor motors 406 (509) and then return to monitoring for further changes in the demand. The controller 434 may also generate an alarm indicating an issue with the fuel system 412 supplying fuel to the gas turbine engine 402.

During the Fail-Fixed event, when a Q command 407 load demand signal to reduce the current horsepower output demand of the propulsor motors 406 is received, the controller 434 may maintain the load on the gas turbine engine 402 using the energy sink 408 while also reducing the horsepower output demand of the propulsor motors 406.

Increasing the load of the energy sink 408 and decreasing the horsepower output demand of the propulsor motors 406 may be performed by the controller 434 in a balanced manner to avoid significant reduction in load on the gas turbine engine 402 in order to avoid a corresponding significant power turbine speed increase, such as into an overspeed condition. Since there is no modulation of the fuel flow to the gas turbine engine 402 (the gas turbine engine horsepower output is fixed), the controller 434 may determine the amount of energy sink 408 needed to offset the reduction in the load caused by the reduction of the demand to the propulsor motors 406. (510) The controller 434 may output a Q command control signal 409 to the local inverter control 468 of the local motor inverter 456 to reduce the torque Q output by the propulsor motors 406 to the respective propulsors 102. (512)

In addition, the controller 434 may selectively enable portions of the energy sink 408 to direct at least some of the electric power output of the electric generator 404 to the energy sink 408. (514) The controller 434 may direct supply of at least some of the electric power to the energy sink 408, which is controlled by the controller 434, to selectively consume electric power supplied from the electric generator 404 so that an output torque of the propulsor motors 406 is reduced in accordance with the demand signal without a corresponding reduction in rotational torque of the gas turbine engine 402. Consumption of electric power by the energy sink 408 may include the controller 434 decreasing the energy efficiency of loads included in the energy sink to increase a level of electric power consumption by the energy sink. The reduction in output torque of the propulsor motors 406 may occur in synchronism with the increase in the energy sink.

The portions of the energy sink 408 which may be independently controlled and are available to be enabled include the variable mechanical energy sink 238 and the variable electrical energy sink 240. (FIG. 2) Enablement by the controller 434 may entail the controller 434 selectively transmitting control signals for adjustment of mechanical or electrical components to decrease efficiency and thereby increase energy consumption of the energy sink 408. (516 and 518) The variable mechanical energy sink may include the motor local control 472, which may, for example, control the propulsor motors 406 to run forward and backward with a motor thrust control, control the pitch angle of the respective propulsors 102, and/or other strategies to decrease efficiency of mechanical devices or mechanical systems included in the hybrid propulsive system.

The variable electric energy sink may include the electrical energy adapters, such as the inverter 456 and the rectifier 454, for which efficiency may be controlled by adapter control signals 484 provided by the controller 434 to the local inverter control 468 and local rectifier control 466, respectively. For example, the controller 434 may direct the supply of at least some of the electric power to the energy sink 408 by reducing efficiency of the inverter 456 supplying electric power to the propulsor motors 406 by changing a timing of switching of switches included in the inverter 456. In another example, the controller 434 may reduce efficiency of the rectifier 456 or the generator 404.

The variable electric energy sink may also include the energy storage 448. The energy storage 448 may be controlled by energy storage signals "S" provided by the controller 434 to the local storage control 464 to be either a load or a source of electric power. In addition, the electric energy sink may include auxiliary loads 486, which may be selectively enabled to consume electric power by auxiliary control signals 488 provided from the controller 434. Examples of auxiliary loads 486 include an aircraft de-icing system and an environmental conditioning system. Each of the auxiliary loads 486 may be selectively energized and deenergized by the controller to dynamically control a magnitude of the variable load.

Also, the electric energy sink may include a resistive load 482, which the controller 434 may control by energization and deenergization of one or more respective switches 490 with a local switch control signal 492, such as a solenoid operated circuit breaker. As another example, the electric energy sink may include the generator 404, which may be controlled for efficiency by a local generator control signal 494 provided by the controller 434 to the local generator control 466.

The controller 434 may direct supply of at least some of the electric power to the energy sink by monitoring a rotational speed of the gas turbine engine 402 and varying a level of energy consumption by the energy sink to control the rotational speed of the gas turbine engine 402 as the demand to the propulsor motors 406 changes. (520) For example, the controller 434 may be configured to manage a rotational speed of the gas turbine engine 402 and a reduction in the electric power supplied to the propulsor motors 406 by diversion from the propulsor motor 406 to the energy sink 408 of at least some of the electric power output by the electric generator 404. In addition, the controller 434 may be configured to receive a reduction in the demand signal indicative of a reduction in load of the propulsor motors 406, and divert a magnitude of the electric power output by the electric generator 404 to the energy sink 408. The magnitude of electric power being diverted may be equivalent to the reduction in load of the propulsor motors 406.

The controller 434 may monitor the rotational speed of the gas turbine engine 402. (522) When the rotational speed of the gas turbine engine 402 increases, the controller 434 may increase load of the energy sink 408 such that a larger portion of the power output from the generator 404 is diverted to the energy sink 408 (524), and the operation may return to monitoring rotational speed. When the rotational speed of the gas turbine engine 402 decreases, the controller 434 may decrease the load of the energy sink 408 such that a smaller portion of the power output from the generator 404 is diverted to the energy sink 408 (526), and the operation may return to monitoring rotational speed. In addition, the controller 434 may monitor for changes in the load demand signal received from the throttle 444. (528) When the demand signal to the propulsor motors 406 increases, the controller 434 may decrease the load magnitude of the energy sink 408 such that a larger portion of the power output from the generator 404 is provided to the propulsor motors 406 (530), and the operation may return to monitoring rotational speed. When the demand signal decreases, the controller 434 may increase the load of the energy sink 408 such that a larger portion of the power output from the generator 404 is diverted to the energy sink 408 (532), and the operation may return to monitoring rotational speed.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
   a controller configured to monitor a status of a fuel system supplying fuel to a gas turbine engine; and
   an electric propulsion system of an aircraft controlled by the controller, the electric propulsion system configured as a variable load supplied rotational energy by the gas turbine engine;
   the controller configured to dynamically control a magnitude of the variable load to adjust a rotational speed of the gas turbine engine during a fixed level of fuel supply to the gas turbine engine.

2. The system of aspect 1, wherein the electric propulsion system includes an electric generator and a propulsor motor rotating a propulsor to provide thrust and/or lift to an aircraft, the electric generator rotationally driven with the gas turbine engine to output electric power, the electric power supplied to the propulsor motor to rotate the propulsor to provide thrust and/or lift of the aircraft.

3. The system of aspect 1 or 2, wherein the electric propulsion system includes an energy sink, the energy sink dynamically controlled by the controller to adjust the variable load to increase a magnitude of rotational energy of the gas turbine engine absorbed by the energy sink in response to receipt, by the controller, of a load demand signal indicative of a lower demand for rotational energy of the electric propulsion system.

4. The system of aspect 3, wherein the energy sink comprises an electric adapter configured to supply electric power for the electric propulsion system, an efficiency of the electric adapter controllable by the controller to increase a magnitude of rotational energy of the gas turbine engine absorbed by the energy sink.

5. The system as in any of aspects 1-4, wherein the fixed level of fuel represents a fixed power output setting of the gas turbine engine, and the rotational speed of the gas turbine engine is adjusted by the controller by increasing or decreasing the variable load to slow or speed up the rotational speed.

6. The system as in any of aspects 1-5, wherein the electric propulsion system comprises a variable energy sink controllable by the controller to increase or decrease the rotational speed of the gas turbine engine by controlling variation of the variable load supplied by rotational energy of the gas turbine engine.

7. The system of aspect 6, wherein the variable energy sink comprises a variable mechanical energy sink and a variable electrical energy sink each independently controllable by the controller as part of the variable load.

8. The system of aspect 7, wherein the variable mechanical energy sink comprises a propulsor pitch control of a propulsor of an aircraft, and the variable electrical energy sink comprises an electric generator or an electric adaptor for conversion of electric power between alternating current (AC) and direct current (DC).

9. The system of aspect 7, wherein the electric propulsion system comprises a plurality of propulsor motors providing propulsion for an aircraft, and the controller is configured to selectively operate some of the plurality of propulsor motors in reverse to contribute to the variable mechanical energy sink, and the controller is configured to decrease efficiency of operation of an electric generator or an electric adapter to contribute to the variable electrical energy sink, wherein the electric adapter is configured to convert electric power between alternating current (AC) and direct current (DC).

10. The system as in any of aspects 1-9, wherein the variable load includes an aircraft de-icing system and an environmental conditioning system, each being selectively energizable by the controller to dynamically control a magnitude of the variable load.

11. A system comprising:
 a controller configured to monitor a status of a fuel system supplying fuel to a gas turbine engine;
 an electric generator rotational driven with the gas turbine engine to output electric power, the electric power supplied to a propulsor motor of an aircraft; and
 an energy sink controlled by the controller to selectively consume electric power output by the electric generator in response to an absence of modulation in fuel supplied, by the fuel system, to the gas turbine engine during a reduction in a demand signal to the propulsor motor.

12. The system of aspect 11, wherein the energy sink is at least two of an electric converter, an electric energy storage device, a motor thrust control, or a resistive load.

13. The system of aspect 11 or 12, wherein the controller is configured to manage a rotational speed of the gas turbine engine and a reduction in the electric power supplied to the propulsor motor by diversion from the propulsor motor to the energy sink of at least some of the electric power output by the electric generator.

14. The system as in any of aspects 11-13, wherein the controller is further configured to receive the reduction in the demand signal indicative of a reduction in load of the propulsor motor, determine that a corresponding modulation in fuel supplied to the gas turbine engine is absent, and divert a magnitude of the electric power output by the electric generator to the energy sink, the magnitude being equivalent to the reduction in load of the propulsor motor.

15. The system as in any of aspects 11-14, wherein the controller is further configured to increase counter-torque on the gas turbine engine to manage gas turbine engine speed by increasing an energy demand from the electric generator.

16. A method comprising:
 monitoring a status of a fuel system supplying fuel to a gas turbine engine;
 rotating, with the gas turbine engine, an electric generator operable to output electric power;
 supplying the electric power from the electric generator to a propulsor motor of an aircraft;
 receiving a reduction in a demand signal to the propulsor motor;
 identifying an absence of expected modulation in a flow of the fuel supplied to the gas turbine engine in response to the reduction in the demand signal; and
 directing, with a controller, supply of at least some of the electric power to an energy sink, the energy sink controlled by the controller to selectively consume electric power supplied from the electric generator so that an output torque of the propulsor motor is reduced in accordance with the demand signal without a corresponding reduction in rotational torque of the gas turbine engine.

17. The method of aspect 16, wherein directing, with the controller, supply of the at least some of the electric power to the energy sink comprises reducing efficiency of an electric adapter supplying the electric power to the propulsor motor by changing a timing of switching of switches included in the electric adapter, the electric adapter being a converter configured to convert between alternating current (AC) and direct current (DC).

18. The method of aspect 16 or 17, wherein directing, with the controller, supply of the at least some of the electric power to the energy sink comprises monitoring a rotational speed of the gas turbine engine and varying a level of energy consumption by the energy sink to control the rotational speed of the gas turbine engine.

19. The method as in any of aspects 16-18, wherein identifying the absence of expected modulation in the flow of the fuel supplied to the gas turbine engine further comprises generating an alarm indicating an issue with the fuel system supplying fuel to the gas turbine engine.

20. The method as in any of aspects 16-19, wherein directing, with the controller, supply of the at least some of the electric power to the energy sink comprises decreasing the energy efficiency of loads included in the energy sink to increase a level of electric power consumption by the energy sink.

What is claimed is:

1. A system comprising:
 a controller configured to monitor a status of a fuel system supplying fuel to a gas turbine engine; and
 an electric propulsion system of an aircraft controlled by the controller, the electric propulsion system configured as a variable load supplied rotational energy by the gas turbine engine;
 the controller configured to dynamically control a magnitude of the variable load to adjust a rotational speed of the gas turbine engine in response to an absence of modulation in fuel flow during a fixed fuel flow event in which a fixed level of fuel is supplied as a constant non-zero fixed amount to the gas turbine engine and a reduction in a demand signal for the electric propulsion system is received.

2. A system comprising:
 a controller configured to monitor a status of a fuel system supplying fuel to a gas turbine engine;
 an electric generator rotationally driven with the gas turbine engine to output electric power, the electric power supplied to a propulsor motor of an aircraft; and
 an energy sink controlled by the controller to selectively consume electric power output by the electric generator during a fixed fuel flow event in response to an absence of modulation in a flow of fuel being supplied, by the fuel system, to the gas turbine engine during a reduction in a demand signal to the propulsor motor wherein the fixed fuel flow event is a condition where the gas turbine engine receives a non-zero fixed amount of fuel flow.

3. The system of claim 2, wherein the energy sink is dynamically controlled by the controller to increase a magnitude of rotational energy of the gas turbine engine absorbed by the energy sink in response to receipt, by the controller, of a load demand signal indicative of a lower demand for rotational energy of the propulsor motor.

4. The system of claim 3, further comprising an electric adapter configured to supply electric power for the propulsor motor, wherein an efficiency of the electric adapter is controllable by the controller to increase a magnitude of rotational energy of the gas turbine engine absorbed by at least one of the electric adapter or the propulsor motor.

5. The system of claim 2, wherein the absence in modulation of the flow of fuel being supplied represents a fixed power output setting of the gas turbine engine, and a rotational speed of the gas turbine engine is adjusted by the controller by increasing or decreasing consumption of electric power by the energy sink, the propulsor motor, or the combination to slow or speed up the rotational speed of the gas turbine engine.

6. The system of claim 2, wherein the energy sink is variably controlled by the controller to increase or decrease a rotational speed of the gas turbine engine by controlling the energy sink to selectively consume electric power output by the electric generator.

7. The system of claim 2, wherein the energy sink comprises a variable mechanical energy sink and a variable electrical energy sink each independently controllable by the controller to selectively consume electric power output by the electric generator.

8. The system of claim 7, wherein the variable mechanical energy sink comprises a propulsor pitch control of a propulsor driven by the propulsor motor, and the variable electrical energy sink comprises an electric adaptor for conversion of electric power between alternating current (AC) and direct current (DC).

9. The system of claim 7, wherein the propulsor motor comprises a plurality of propulsor motors providing propulsion for the aircraft, and the controller is configured to selectively operate some of the plurality of propulsor motors in reverse to contribute to the variable mechanical energy sink, and the controller is configured to decrease efficiency of operation of the electric generator or an electric adapter to contribute to the variable electrical energy sink, wherein the electric adapter is configured to convert electric power between alternating current (AC) and direct current (DC).

10. The system of claim 2, wherein the electric generator and the energy sink are included in a variable load of the aircraft, the variable load further comprising an aircraft de-icing system and an environmental conditioning system, each being selectively energizable by the controller to dynamically control a magnitude of the variable load.

11. The system of claim 2, wherein the propulsor motor rotates a propulsor to provide thrust and/or lift to an aircraft, and the electric power output by the electric generator is supplied to the propulsor motor to rotate the propulsor to provide thrust and/or lift of the aircraft.

12. The system of claim 2, wherein the energy sink comprises an electric energy storage device and at least one of an electric converter, a motor thrust control, or a resistive load.

13. The system of claim 2, wherein the controller is configured to manage a rotational speed of the gas turbine engine and a reduction in the electric power supplied to the propulsor motor by diversion from the propulsor motor to the energy sink of at least some of the electric power output by the electric generator.

14. The system of claim 2, wherein the controller is further configured to receive the reduction in the demand signal indicative of a reduction in load of the propulsor motor, determine that a corresponding modulation in fuel supplied to the gas turbine engine is absent, and divert a magnitude of the electric power output by the electric generator to the energy sink, the magnitude being equivalent to the reduction in load of the propulsor motor.

15. The system of claim 2, wherein the controller is further configured to increase counter-torque on the gas turbine engine to manage gas turbine engine speed by increasing an energy demand from the electric generator.

16. A method comprising:
monitoring a status of a fuel system supplying fuel to a gas turbine engine;
rotating, with the gas turbine engine, an electric generator operable to output electric power;
supplying the electric power from the electric generator to a propulsor motor of an aircraft;
receiving a reduction in a demand signal to the propulsor motor;
identifying an absence of expected modulation in a non-zero amount of flow of the fuel supplied to the gas turbine engine in response to the reduction in the demand signal during a fixed fuel flow event; and
directing, with a controller, supply of at least some of the electric power to an energy sink, the energy sink controlled by the controller to selectively consume electric power supplied from the electric generator so that an output torque of the propulsor motor is reduced in accordance with the demand signal without a corresponding reduction in rotational torque of the gas turbine engine.

17. The method of claim 16, wherein directing, with the controller, supply of the at least some of the electric power to the energy sink comprises reducing efficiency of an electric adapter supplying the electric power to the propulsor motor by changing a timing of switching of switches included in the electric adapter, the electric adapter being a converter configured to convert between alternating current (AC) and direct current (DC).

18. The method of claim 16, wherein directing, with the controller, supply of the at least some of the electric power to the energy sink comprises monitoring a rotational speed of the gas turbine engine and varying a level of energy consumption by the energy sink to control the rotational speed of the gas turbine engine.

19. The method of claim 16, wherein identifying the absence of expected modulation in the flow of the fuel supplied to the gas turbine engine further comprises generating an alarm indicating an issue with the fuel system supplying fuel to the gas turbine engine.

20. The method of claim 16, wherein directing, with the controller, supply of the at least some of the electric power to the energy sink comprises decreasing the energy efficiency of loads included in the energy sink to increase a level of electric power consumption by the energy sink.

* * * * *